United States Patent Office 3,127,429
Patented Mar. 31, 1964

3,127,429
3-HALO-Δ¹ AND 1-HALO-Δ²-ANDROSTENES AND
PROCESS THEREFOR
Alexander D. Cross and Albert Bowers, both of Mexico
City, Mexico, assignors, by mesne assignments, to
Syntex Corporation, a corporation of Panama
No Drawing. Filed Dec. 4, 1961, Ser. No. 156,925
24 Claims. (Cl. 260—397.5)

The present invention relates to novel cyclopentanophenanthrene compounds and to a process for the production thereof.

More particularly the present invention relates to 3-halo-Δ¹- and 1-halo-Δ²-androstene derivatives.

The novel compounds of the present invention which are potent anabolic agents with low androgenicity, and which exhibit anti-estrogenic and anti-gonadotrophic activities and lower the cholesterol level in the blood, serum and liver, are represented by the following formulas:

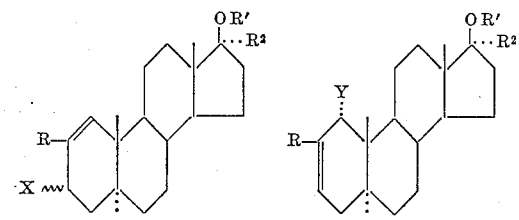

In the above formulas R may be hydrogen or methyl; $R^1$ represents hydrogen or a hydrocarbon carboxylic acyl group containing less than 12 carbon atoms; $R^2$ may be hydrogen or an alkyl, alkenyl or alkynyl group of up to 6 carbon atoms; X represents fluorine or chlorine and Y represents α-fluorine or β-chlorine.

The acyl group is derived from hydrocarbon carboxylic acids containing less than 12 carbon atoms which may be saturated or unsatuarted, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process exemplified by the following equation:

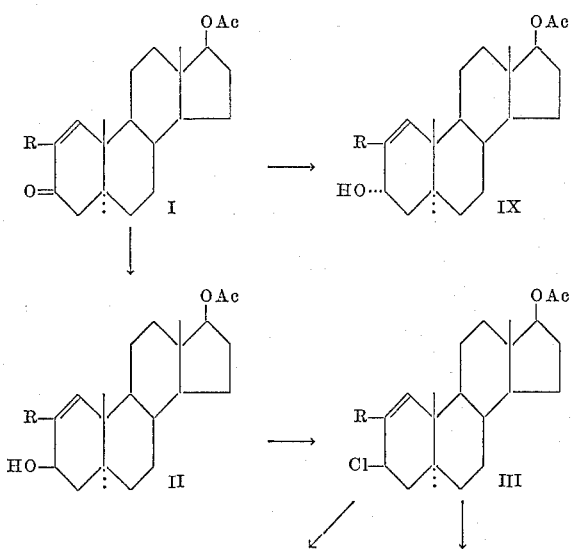

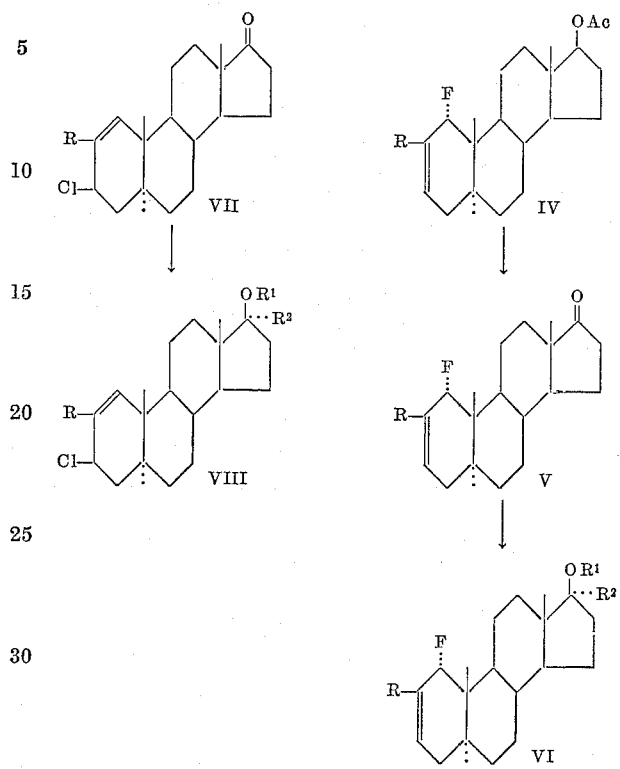

In the above formulas R, $R^1$ and $R^2$ have the same meaning as hereinbefore set forth and Ac represents the acetyl radical.

In practicing the process just outlined, the starting compound which is Δ¹-androsten-17β-ol-3-one acetate or the 2-methyl derivative thereof (I) (described by Fieser and Fieser, "Steroids," Reinhold Publishing Corporation, New York, 1959, at page 520, and by Mauli et al., J.A.C.S. 82 (1960), pages 5494–5499) is reduced preferably with sodium borohydride affording after chromatographic separation the corresponding Δ¹-androsten-3β,17β-diol-17-acetate (II) and Δ¹-androsten-3α,17β-diol-17-acetate (IX) compounds. The Δ¹-androsten-3β,17β-diol-17-acetate derivative (II) upon treatment with thionyl chloride in a solvent inert to the reagent such as ether, yields the corresponding 3β-chloro-Δ¹-androsten-17β-ol-acetate derivative (III). Reaction of this compound with acid potassium fluoride in a suitable solvent such as dimethylformamide, at reflux temperature and for a period of time of the order of 1 hour, affords the corresponding 1α-fluoro-Δ²-androsten-17β-ol-17-acetate derivative (IV).

Upon conventional saponification of the latter compound followed by subsequent oxidation of the thus obtained 17β-alcohol, preferably with chromium trioxide in pyridine, there is obtained the corresponding 1α-fluoro-Δ²-androsten-17-one derivative (V). Upon treatment of the latter compounds with an alkyl, alkenyl or alkynyl magnesium halide such as methyl, vinyl or ethynyl magnesium bromide, there is obtained the corresponding 17α-alkyl, 17α-alkenyl, 17α-alkynyl-17β-hydroxy compounds (VI: $R^1$=hydrogen; $R^2$=hydrocarbon) which may then be esterified with a hydrocarbon carboxylic acid anhydride or chloride of less than 12 carbon atoms in the presence of p-toluenesulfonic acid and a solvent such as benzene.

The 1α fluoro-Δ²-androsten-17β-ol obtained from the conventional saponification of the corresponding acetate (IV) may be further conventionally esterified in pyridine with another hydrocarbon carboxylic acid anhydride or chloride of less than 12 carbon atoms to afford the corresponding 17β-acylates (VI: $R^1$=acyl; $R^2$=hydrogen).

Upon conventional saponification of the 3β-chloro-Δ¹-androsten-17β-ol acetate derivatives (III) and subsequent oxidation of the thus obtained free alcohol, preferably with chromium trioxide, there is obtained the corresponding 17-keto compounds (VII) which upon reaction with an aliphatic hydrocarbon magnesium halide as described above are converted into the 17α-aliphatic hydrocarbon derivatives of 3β-chloro-Δ¹-androsten-17β-ol or the 2-methyl derivative thereof (VIII: $R^1$=hydrogen; $R^2$=aliphatic hydrocarbon). The latter compounds may then be esterified in the same manner as described hereinabove to afford the 17β-esters thereof (VIII: $R^1$=acyl; $R^2$=aliphatic hydrocarbon).

The free alcohol, 3β-chloro-Δ¹-androsten-17β-ol or the 2-methyl derivative obtained from the saponification of the corresponding 3β-chloro-Δ¹-androsten-17β-ol acetate (III) may be esterified with another hydrocarbon carboxylic acid anhydride or chloride containing less than 12 carbon atoms to afford the corresponding 17β-acylate (VIII: $R^1$=acyl; $R^2$=hydrogen).

In another aspect of the present invention, the 1α-chloro and 3-fluoro derivatives may be obtained by a process illustrated by the following equation:

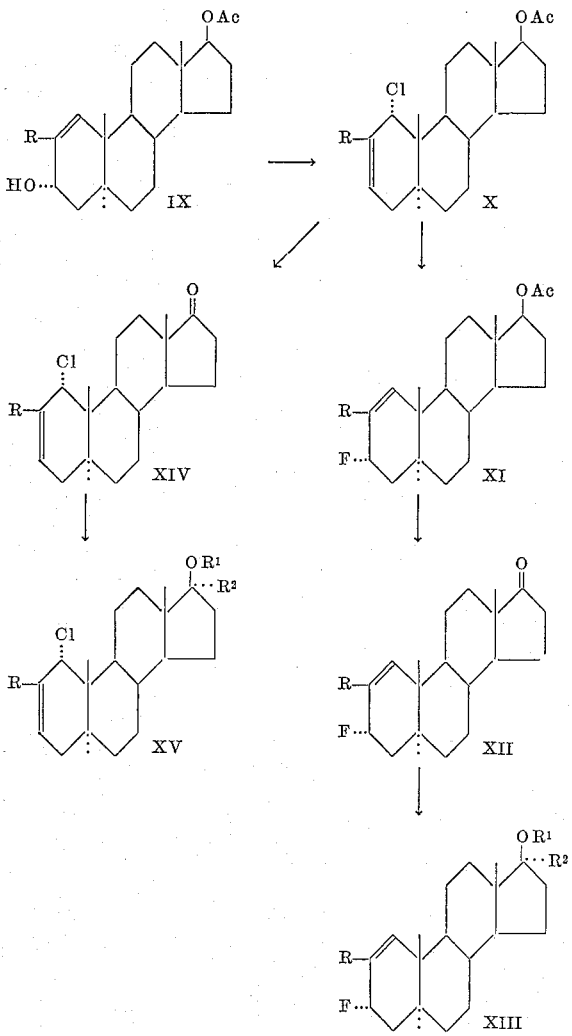

In the above formulas, R, $R^1$, $R^2$ and Ac have the same meaning as previously described.

In practicing the process outlined above, Δ¹-androsten-3α,17β-diol-17-acetate or the 2-methyl derivative thereof (IX) is treated with thionyl chloride in an inert solvent, preferably ether, in the presence of an amine hydro-chloride, as for example, tri-n-butylamine hydrochloride, at room temperature and for a period of time of the order of 21 hours, to afford the corresponding 1α-chloro-Δ²-androsten-17β-ol-17β-acetate derivative (X). The latter compound is treated with acid potassium fluoride in a suitable solvent such as dimethylformamide at reflux temperature for a period of time of the order of one hour to afford the corresponding 3α-fluoro-Δ¹-androsten-17β-ol-17-acetate derivative (XI).

Upon conventional saponification of the latter and subsequent oxidation of the thus obtained free 17β-alcohol as with chromium trioxide, there is obtained the corresponding 3α-fluoro-Δ¹-androsten-17-one (XII) which upon further reaction with an aliphatic hydrocarbon magnesium halide such as methyl, vinyl or ethynyl magnesium bromide, there is obtained the corresponding 17α-aliphatic hydrocarbon - 3α - fluoro - Δ¹ - androsten-17β-ol (XIII: $R^1$=hydrogen; $R^2$=aliphatic hydrocarbon). The latter may then be esterified as described heretofore with the hydrocarbon carboxylic acid anhydride or chloride to yield the corresponding 17β-acylates (XIII: $R^1$=acyl; $R^2$=aliphatic hydrocarbon).

Similarly the 1α-chloro-Δ²-androsten-17β-ol-acetate derivative (X) may be conventionally saponified to yield the corresponding free 17β-ol compound, which upon oxidation as described above is converted into the 1α-chloro-Δ²-androsten-17-one compound (XIV). The latter may then be treated with the same type of Grignard reagent as set forth previously to form the 1α-chloro-17α-aliphatic hydrocarbon-Δ²-androsten-17β-ol derivative (XV: $R^1$=hydrogen; $R^2$=aliphatic hydrocarbon) which may be further esterified as described above to afford the corresponding 17β-acylates (XV: $R^1$=acyl; $R^2$=aliphatic hydrocarbon).

The free 1α-chloro-Δ²-androsten-17β-ol and 3α-fluoro-Δ¹-androsten - 17β - ol obtained upon the conventional saponification of the respective acetates (X, XI) may be further esterified with another hydrocarbon carboxylic acid anhydride or chloride in pyridine to afford the respective esters (XV; XIII: $R^1$=acyl, $R^2$=hydrogen).

The following examples serve to illustrate but are not intended to limit the scope of the invention:

*Example I*

A mixture of 1 g. of 2-methyl-Δ¹-androsten-17β-ol-3-one, 4 cc. of pyridine and 2 cc. of acetic anhydride was kept at room temperature overnight, poured into ice water, the formed precipitate was filtered, washed with water and dried. Crystallization from acetone-hexane gave the 17-acetate of 2-methyl-Δ¹-androsten-17β-ol-3-one.

By the same procedure was treated Δ¹-androsten-17β-ol-3-one, furnishing Δ¹-androsten-17β-ol-3-one acetate.

*Example II*

A solution of 2 g. of sodium borohydride in 30 cc. of methanol was added with stirring to a solution of 2 g. of Δ¹-androsten-17β-ol-3-one-17-acetate in 40 cc. of tetrahydrofuran. The mixture was kept at room temperature for 3 hours, the excess reagent was decomposed by addition of acetic acid, the resulting solution concentrated to small volume in vacuo and diluted with water. The product was extracted with ethyl acetate, the extract washed with water, dried and evaporated. Alumina chromatography and crystallization of the solid fractions from acetone-hexane gave Δ¹-androsten - 3β,17β - diol-17-acetate and Δ¹-androsten-3α,17β-diol-17-acetate.

When applying the above procedure to 2-methyl-Δ¹-androsten-17β-ol-3-one-17-acetate there were obtained 2-methyl-Δ¹-androsten-3α,17β-diol-17-acetate and 2-methyl-Δ¹-androsten-3β,17β-diol-17-acetate.

*Example III*

A solution of 1 g. of Δ¹-androsten-3β,17β-diol-17-acetate in 50 cc. of anhydrous ether was treated with 1.5 cc. of purified thionyl chloride at 0° C. The reaction mixture was allowed to stand at the same temperature for 6 minutes, then it was washed with aqueous sodium bicarbonate solution, water, dried over anhydrous sodium sulfate and evaporated to dryness. Crystallization of the solid residue from ether-ethyl acetate yielded 3β-chloro-Δ¹-androsten-17β-ol-acetate.

Following the above procedure was treated 2-methyl-Δ¹-androsten-3β, 17β-diol-17-acetate, furnishing 2-methyl-3β-chloro-Δ¹-androsten-17β-ol-17-acetate.

*Example IV*

A solution of 9 g. of tri-n-butylamine hydrochloride in 1000 cc. of ether was prepared by treating the ethereal suspension of the amine hydrochloride with enough anhydrous hydrogen chloride to effect solution. To this solution were added 5 g. of Δ¹-androsten-3β, 17β-diol-17-acetate followed by 7.3 cc. of thionyl chloride and the system was flushed with nitrogen and sealed. After standing at room temperature for 21 hours, the solution was successively washed with water, dilute hydrochloric acid, dilute sodium bicarbonate solution, and water, dried over anhydrous sodium sulfate, and evaporated to dryness. Crystallization of the residue from acetone-hexane furnished 1α-chloro-Δ²-androsten-17β-ol-17-acetate.

By the same technique was treated 2-methyl-Δ¹-androsten-3α,17β-diol-17-acetate, thus yielding 2-methyl-1α-chloro-Δ²-androsten-17β-ol-17-acetate.

*Example V*

A mixture of 1 g. of 1α-chloro-Δ²-androsten-17β-ol-17-acetate, 1 g. of dry acid potassium fluoride and 50 cc. of dimethylformamide was refluxed for 1 hour. The mixture was then poured into water, the formed precipitate filtered off and crystallized from acetone-hexane to give 3α-fluoro-Δ¹-androsten-17β-ol-17-acetate.

By the above procedure was treated 2-methyl-1α-chloro-Δ²-androsten-17β-ol-17-acetate, affording 2-methyl-3α-fluoro-Δ¹-androsten-17β-ol-17-acetate.

*Example VI*

3β-chloro-Δ¹-androsten-17β-ol-17-acetate and 2-methyl-3β-chloro-Δ¹-androsten-17β-ol-17-acetate were treated following the technique described in Example V yielding respectively 1α-fluoro-Δ²-androsten-17β-ol-17-acetate and 2-methyl-1α-fluoro-Δ²-androsten-17β-ol-17-acetate.

*Example VII*

A solution of 1 g. of 1α-chloro-Δ²-androsten-17β-ol-17-acetate in 50 cc. of methanol was kept for 24 hours with 250 mg. of potassium hydroxide dissolved in 1 cc. of water at 0° C.; it was then poured into ice water, the precipitate collected, washed with water to neutral and dried, thus producing a crude compound which upon recrystallization from methylene chloride-ether afforded 1α-chloro-Δ²-androsten-17β-ol.

When applying the foregoing procedure to the starting compounds listed below, there were obtained the corresponding products hereinafter set forth.

| Starting Compounds | Products |
|---|---|
| 3β-chloro-Δ¹-androsten-17β-ol-17-acetate. | 3β-chloro-Δ¹-androsten-17β-ol. |
| 3α-fluoro-Δ¹-androsten-17β-ol-17-acetate. | 3α-fluoro-Δ¹-androsten-17β-ol. |
| 1α-fluoro-Δ²-androsten-17β-ol-17-acetate. | 1α-fluoro-Δ²-androsten-17β-ol. |
| 2-methyl-1α-chloro-Δ²-androsten-17β-ol-17-acetate. | 2-methyl-1α-chloro-Δ²-androsten-17β-ol. |
| 2-methyl-1α-fluoro-Δ²-androsten-17β-ol-17-acetate. | 2-methyl-1α-fluoro-Δ²-androsten-17β-ol. |
| 2-methyl-3β-chloro-Δ¹-androsten-17β-ol-17-acetate. | 2-methyl-3β-chloro-Δ¹-androsten-17β-ol. |
| 2-methyl-3α-fluoro-Δ¹-androsten-17β-ol-17-acetate. | 2-methyl-3α-fluoro-Δ¹-androsten-17β-ol. |

*Example VIII*

A solution of 6 g. of 1α-chloro-Δ²-androsten-17β-ol obtained in accordance with Example VII in 120 cc. of pyridine was added to a mixture of 6 g. of chromic trioxide in 120 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 1α-chloro-Δ²-androsten-17-one.

Following the same procedure were treated the starting compounds hereinafter set forth, furnishing the corresponding products disclosed below.

| Starting Compounds | Products |
|---|---|
| 3β-chloro-Δ¹-androsten-17β-ol | 3β-chloro-Δ¹-androsten-17-one. |
| 3α-fluoro-Δ¹-androsten-17β-ol | 3α-fluoro-Δ¹-androsten-17-one. |
| 1α-fluoro-Δ²-androsten-17β-ol | 1α-fluoro-Δ²-androsten-17-one. |
| 2-methyl-1α-chloro-Δ²-androsten-17β-ol. | 2-methyl-1α-chloro-Δ²-androsten-17-one. |
| 2-methyl-1α-fluoro-Δ²-androsten-17β-ol. | 2-methyl-1α-fluoro-Δ²-androsten-17-one. |
| 2-methyl-3β-chloro-Δ¹-androsten-17β-ol. | 2-methyl-3β-chloro-Δ²-androsten-17-one. |
| 2-methyl-3α-fluoro-Δ¹-androsten-17β-ol. | 2-methyl-3α-fluoro-Δ¹-androsten-17-one. |

*Example IX*

A solution of 5 g. of 1α-chloro-Δ²-androsten-17-one in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α-methyl-1α-chloro-Δ²-androsten-17β-ol.

The following starting compounds were treated with the indicated Grignard reagent, according to the preceding method, thus furnishing the corresponding products hereinafter set forth:

| Starting Compounds | Grignard Reagent | Products |
|---|---|---|
| 1α-chloro-Δ²-androsten-17-one. | vinyl magnesium bromide. | 17α-vinyl-1α-chloro-Δ-androsten-17β-ol. |
| 1α-chloro-Δ²-androsten-17-one. | ethynyl magnesium bromide. | 17α-ethynyl-1α-chloro-Δ²-androsten-17β-ol. |
| 3β-chloro-Δ¹-androsten-17-one. | methyl magnesium bromide. | 17α-methyl-3β-chloro-Δ¹-androsten-17β-ol. |
| 3β-chloro-Δ¹-androsten-17-one. | vinyl magnesium bromide. | 17α-vinyl-3β-chloro-Δ¹-androsten-17β-ol. |
| 3β-chloro-Δ¹-androsten-17-one. | ethynyl magnesium bromide. | 17α-ethynyl-3β-chloro-Δ¹-androsten-17β-ol. |
| 3α-fluoro-Δ¹-androsten-17-one. | methyl magnesium bromide. | 17α-methyl-3α-fluoro-Δ¹-androsten-17β-ol. |
| 3α-fluoro-Δ¹-androsten-17-one. | vinyl magnesium bromide. | 17α-vinyl-3α-fluoro-Δ¹-androsten-17β-ol. |
| 3α-fluoro-Δ¹-androsten-17-one. | ethynyl magnesium bromide. | 17α-ethynyl-3α-fluoro-Δ¹-androsten-17β-ol. |
| 1α-fluoro-Δ²-androsten-17-one. | methyl magnesium bromide. | 17α-methyl-1α-fluoro-Δ²-androsten-17β-ol. |
| 1α-fluoro-Δ²-androsten-17-one. | vinyl magnesium bromide. | 17α-vinyl-1α-fluoro-Δ²-androsten-17β-ol. |
| 1α-fluoro-Δ²-androsten-17-one. | ethynyl magnesium bromide. | 17α-ethynyl-1α-fluoro-Δ²-androsten-17β-ol. |
| 2-methyl-1α-chloro-Δ²-androsten-17-one. | methyl magnesium bromide. | 2,17α-dimethyl-1α-chloro-Δ²-androsten-17β-ol. |
| 2-methyl-1α-chloro-Δ²-androsten-17-one. | vinyl magnesium bromide. | 2-methyl-17α-vinyl-1α-chloro-Δ²-androsten-17β-ol. |
| 2-methyl-1α-chloro-Δ²-androsten-17-one. | ethynyl magnesium bromide. | 2-methyl-17α-ethynyl-1α-chloro-Δ²-androsten-17β-ol. |
| 2-methyl-1α-fluoro-Δ²-androsten-17-one. | methyl magnesium bromide. | 2,17α-dimethyl-1α-fluoro-Δ²-androsten-17β-ol. |
| 2-methyl-1α-fluoro-Δ²-androsten-17-one. | vinyl magnesium bromide. | 2-methyl-17α-vinyl-1α-fluoro-Δ²-androsten-17β-ol. |
| 2-methyl-1α-fluoro-Δ²-androsten-17-one. | ethynyl magnesium bromide. | 2-methyl-17α-ethynyl-1α-fluoro-Δ²-androsten-17-ol. |
| 2-methyl-3β-chloro-Δ¹-androsten-17-one. | methyl magnesium bromide. | 2,17α-dimethyl-3β-chloro-Δ¹-androsten-17β-ol. |

| Starting Compounds | Grignard Reagent | Products |
|---|---|---|
| 2-methyl-3α-chloro-Δ¹-androsten-17-one. | vinyl magnesium bromide. | 2-methyl-17α-vinyl-3β-chloro-Δ¹-androsten-17β-ol. |
| 2-methyl-3β-chloro-Δ¹-androsten-17-one. | ethynyl magnesium bromide. | 2-methyl-17α-ethynyl-3β-chloro-Δ¹-androsten-17β-ol. |
| 2-methyl-3α-fluoro-Δ¹-androsten-17-one. | methyl magnesium bromide. | 2,17α-dimethyl-3α-fluoro-Δ¹-androsten-17β-ol. |
| 2-methyl-3α-fluoro-Δ¹-androsten-17-one. | vinyl magnesium bromide. | 2-methyl-17α-vinyl-3α-fluoro-Δ¹-androsten-17β-ol. |
| 2-methyl-3α-fluoro-Δ¹-androsten-17-one. | ethynyl magnesium bromide. | 2-methyl-17α-ethynyl-3α-fluoro-Δ¹-androsten-17-β-ol. |

*Example X*

A mixture of 1 g. of 1α-chloro-Δ²-androsten-17β-ol, 4 cc. of pyridine and 2 cc. of propionic anhydride was kept at room temperature overnight, poured into ice water and dried. Crystallization from acetone-hexane gave the 17-propionate of 1α-chloro-Δ²-androsten-17β-ol.

The following starting compounds were treated in accordance with the above procedure, thus yielding the corresponding products disclosed hereinafter:

| Starting Compounds | Products |
|---|---|
| 3β-chloro-Δ¹-androsten-17β-ol | 17-propionate of 3β-chloro-Δ¹-androsten-17β-ol. |
| 3α-fluoro-Δ¹-androsten-17β-ol | 17-propionate of 3α-fluoro-Δ¹-androsten-17β-ol. |
| 1α-fluoro-Δ²-androsten-17β-ol | 17-propionate of 1α-fluoro-Δ²-androsten-17β-ol. |
| 2-methyl-1α-chloro-Δ²-androsten-17β-ol. | 17-propionate of 2-methyl-1α-chloro-Δ²-androsten-17β-ol. |
| 2-methyl-1α-fluoro-Δ²-androsten-17β-ol. | 17-propionate of 2-methyl-1α-fluoro-Δ²-androsten-17β-ol. |
| 2-methyl-3β-chloro-Δ¹-androsten-17β-ol. | 17-propionate of 2-methyl-3β-chloro-Δ¹-androsten-17β-ol. |
| 2-methyl-3α-fluoro-Δ¹-androsten-17β-ol. | 17-propionate of 2-methyl-3α-fluoro-Δ¹-androsten-17β-ol. |

*Example XI*

Using exactly the same conditions described in Example X, but substituting propionic anhydride by caproic anhydride, cyclopentylpropionic anhydride and benzoyl chloride, there were correspondingly obtained the 17-caproates, 17-cyclopentylpropionates and 17-benzoates of the starting compounds mentioned in the same example.

*Example XII*

A mixture of 1 g. of 17α-methyl-1α-chloro-Δ²-androsten-17β-ol, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave 17α-methyl-1α-chloro-Δ²-androsten-17β-ol-17-acetate.

When applying the above technique to the starting compounds listed below, there were obtained the corresponding products disclosed hereinafter:

| Starting Compounds | Products |
|---|---|
| 17α-vinyl-1α-chloro-Δ²-androsten-17β-ol. | 17-acetate of 17α-vinyl-1α-chloro-Δ²-androsten-17β-ol. |
| 17α-ethynyl-1α-chloro-Δ²-androsten-17β-ol. | 17-acetate of 17α-ethynyl-1α-chloro-Δ²-androsten-17β-ol. |
| 17α-methyl-3β-chloro-Δ¹-androsten-17β-ol. | 17-acetate of 17α-methyl-3β-chloro-Δ¹-androsten-17β-ol. |
| 17α-vinyl-3β-chloro-Δ¹-androsten-17β-ol. | 17-acetate of 17α-vinyl-3β-chloro-Δ¹-androsten-17β-ol. |
| 17α-ethynyl-3β-chloro-Δ¹-androsten-17β-ol. | 17-acetate of 17α-ethynyl-3β-chloro-Δ¹-androsten-17β-ol. |
| 17α-methyl-3α-fluoro-Δ¹-androsten-17β-ol. | 17-acetate of 17α-methyl-3α-fluoro-Δ¹-androsten-17β-ol. |
| 17α-vinyl-3α-fluoro-Δ¹-androsten-17β-ol. | 17-acetate of 17α-vinyl-3α-fluoro-Δ¹-androsten-17β-ol. |
| 17α-ethynyl-3α-fluoro-Δ¹-androsten-17β-ol. | 17-acetate of 17α-ethynyl-3α-fluoro-Δ¹-androsten-17β-ol. |
| 17α-methyl-1α-fluoro-Δ²-androsten-17β-ol. | 17-acetate of 17α-methyl-1α-fluoro-Δ²-androsten-17β-ol. |
| 17α-vinyl-1α-fluoro-Δ²-androsten-17β-ol. | 17-acetate of 17α-vinyl-1α-fluoro-Δ²-androsten-17β-ol. |
| 17α-ethynyl-1α-fluoro-Δ²-androsten-17β-ol. | 17-acetate of 17α-ethynyl-1α-fluoro-Δ²-androsten-17β-ol. |
| 2,17α-dimethyl-1α-chloro-Δ²-androsten-17β-ol. | 17-acetate of 2,17α-dimethyl-1α-chloro-Δ²-androsten-17β-ol. |
| 2-methyl-17α-vinyl-1α-chloro-Δ²-androsten-17β-ol. | 17-acetate of 2-methyl-17α-vinyl-1α-chloro-Δ²-androsten-17β-ol. |
| 2-methyl-17α-ethynyl-1α-chloro-Δ²-androsten-17β-ol. | 17-acetate of 2-methyl-17α-ethynyl-1α-chloro-Δ²-androsten-17β-ol. |
| 2,17α-dimethyl-1α-fluoro-Δ²-androsten-17β-ol. | 17-acetate of 2,17α-dimethyl-1α-fluoro-Δ²-androsten-17β-ol. |
| 2-methyl-17α-vinyl-1α-fluoro-Δ²-androsten-17β-ol. | 17-acetate of 2-methyl-17α-vinyl-1α-fluoro-Δ²-androsten-17β-ol. |
| 2-methyl-17α-ethynyl-1α-fluoro-Δ²-androsten-17β-ol. | 17-acetate of 2-methyl-17α-ethynyl-1α-fluoro-Δ²-androsten-17β-ol. |
| 2,17α-dimethyl-3β-chloro-Δ¹-androsten-17β-ol. | 17-acetate of 2,17α-dimethyl-3β-chloro-Δ¹-androsten-17β-ol. |
| 2-methyl-17α-vinyl-3β-chloro-Δ¹-androsten-17β-ol. | 17-acetate of 2,17α-vinyl-3β-chloro-Δ¹-androsten-17β-ol. |
| 2-methyl-17α-ethynyl-3β-chloro-Δ¹-androsten-17β-ol. | 17-acetate of 2-methyl-17α-ethynyl-3β-chloro-Δ¹-androsten-17β-ol. |
| 2,17α-dimethyl-3α-fluoro-Δ¹-androsten-17β-ol. | 17-acetate of 2,17α-dimethyl-3α-fluoro-Δ¹-androsten-17β-ol. |
| 2-methyl-17α-vinyl-3α-fluoro-Δ¹-androsten-17β-ol. | 17-acetate of 2-methyl-17α-vinyl-3α-fluoro-Δ¹-androsten-17β-ol. |
| 2-methyl-17α-ethynyl-3α-fluoro-Δ¹-androsten-17β-ol. | 17-acetate of 2-methyl-17α-ethynyl-3α-fluoro-Δ¹-androsten-17β-ol. |

*Example XIII*

Following the procedure described in Example XII, but substituting acetic anhydride by propionic anhydride, caproic anhydride and cyclopentylpropionic anhydride, there were correspondingly obtained the 17-propionates, 17-caproates and 17-cyclopentylpropionates of the starting compounds set forth in the aforementioned example.

We claim:

1. A compound of the following formula:

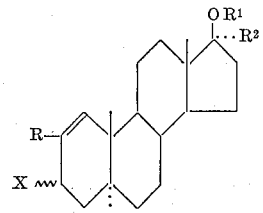

wherein R is a member of the group consisting of hydrogen and methyl; R¹ is selected from the group consisting of hydrogen and a hydrocarbon carboxylic acyl group of less than 12 carbon atoms; R² is a member of the group consisting of hydrogen, lower alkyl, lower alkenyl and lower alkynyl and X is selected from the group consisting of α-fluorine and β-chlorine.

2. 3β-chloro-Δ¹-androsten-17β-ol.
3. 2-methyl-3β-chloro-Δ¹-androsten-17β-ol.
4. 3α-fluoro-Δ¹-androsten-17β-ol.
5. 2-methyl-3α-fluoro-Δ¹-androsten-17β-ol.
6. 17α-methyl-3α-fluoro-Δ¹-androsten-17β-ol.
7. 2,17α-dimethyl-3α-fluoro-Δ¹-androsten-17β-ol.
8. 2,17α-dimethyl-3β-chloro-Δ¹-androsten-17β-ol.
9. 17α-vinyl-3β-chloro-Δ¹-androsten-17β-ol.
10. 17α-ethynyl-3β-chloro-Δ¹-androsten-17β-ol.
11. A compound of the following formula:

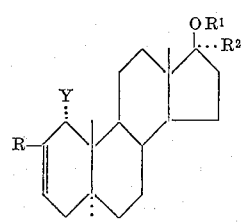

wherein R is a member of the group consisting of hydrogen and methyl; R¹ is selected from the group consisting of hydrogen and a hydrocarbon carboxylic acyl group of less than 12 carbon atoms; R² is a member of the group consisting of hydrogen, lower alkyl, lower alkenyl and lower alkynyl and Y is selected from the group consisting of fluorine and chlorine.

12. 1α-chloro-Δ²-androsten-17β-ol.
13. 2-methyl-1α-chloro-Δ²-androsten-17β-ol.
14. 1α-fluoro-Δ²-androsten-17β-ol.
15. 2-methyl-1α-fluoro-Δ²-androsten-17β-ol.
16. 17α-methyl-1α-chloro-Δ²-androsten-17β-ol.
17. 17α-vinyl-1α-chloro-Δ²-androsten-17β-ol.
18. 17α-ethynyl-1α-fluoro-Δ²-androsten-17β-ol.

19. A process for the production of 1α-chloro-Δ²-androsten-derivatives which comprises treating the corresponding 3α-hydroxy-Δ¹-androsten compound with thionyl chloride in the presence of an amine hydrochloride and an organic solvent.

20. The process of claim 19 wherein the amine is tri-n-butylamine and the solvent is ether.

21. A process for the production of 3α-fluoro-Δ¹-androsten derivatives which comprises treating the corresponding 1α-chloro-Δ²-androsten compound with an acid alkali metal fluoride in a suitable solvent.

22. A process for the production of 1α-fluoro-Δ²-androsten-derivatives which comprises treating the corresponding 3β-chloro-Δ¹-androsten compound with an acid alkali metal fluoride in a suitable solvent.

23. The process of claim 21 wherein the acid alkali metal fluoride is acid potassium fluoride and the solvent is dimethyl-formamide.

24. The process of claim 22 wherein the acid alkali metal fluoride is acid potassium fluoride and the solvent is dimethyl-formamide.

No references cited.